United States Patent
Meunier et al.

[15] 3,699,560
[45] Oct. 17, 1972

[54] PRECISION POSITION INDICATOR

[72] Inventors: Joseph R. J. Meunier, Xenia; Heinrich J. Wieg, New Burlington, both of Ohio

[73] Assignee: The Bendix Corporation

[22] Filed: Oct. 8, 1970

[21] Appl. No.: 79,268

Related U.S. Application Data

[63] Continuation of Ser. No. 691,528, Dec. 18, 1967.

[52] U.S. Cl. .................. 340/239 R, 73/209, 250/209, 250/218
[51] Int. Cl. ............................................. G08b 21/00
[58] Field of Search ...... 340/239, 266; 250/209, 218, 250/220; 73/209, 308

[56] References Cited

UNITED STATES PATENTS

| | | | |
|---|---|---|---|
| 2,383,321 | 8/1945 | Kleber | 250/230 X |
| 1,960,428 | 5/1934 | Adams | 340/266 X |

*Primary Examiner*—John W. Caldwell
*Assistant Examiner*—Daniel Myer
*Attorney*—Eugene C. Goodale and Plante, Hartz, Smith & Thompson

[57] ABSTRACT

An arrangement for providing indicator signals corresponding to the position of a movable object along a path including a pair of spaced limit stations, each in turn comprised of a pair of photocell sensors which produce high-low output signals when shaded or unshaded, respectively, by the movable object, and which are spaced so as to be simultaneously shaded as the object moves past the limit station. Logic circuitry decodes these signals along these stations to provide a first indicator signal if the object unshades one of the sensors moving in one direction away from the other and a second indicator signal if the object unshades the sensor moving in another direction towards the other station by using the high-low signals of the other sensor at the station. The other station is similarly arranged to provide a third indicator signal in response to the high-low signals upon unshading of the outermost sensor relative to the other station by the object in moving a direction away from the other limit station and producing one of the indicator signals produced by the other limit stations upon unshading of the sensor by the object moving towards the other limit station, to thus provide an indication of the presence or absence of the movable object from the zone between the stations, and whether it is above or below the zone.

8 Claims, 3 Drawing Figures

PATENTED OCT 17 1972 3,699,560

INVENTORS
JOSEPH R.J. MEUNIER &
HEINRICH J. WIEG
BY
Eugene C. Goodale
ATTORNEY

PRECISION POSITION INDICATOR

This is a continuation of application Ser. No. 691,528, filed Dec. 18, 1967.

BACKGROUND OF THE INVENTION

1. Field of the Invention

This invention relates to a sensing apparatus and more particularly to photoelectric sensing apparatus for detecting and effecting visual or other registration of a movable object along a predetermined path relative to pre-established limits. For example, it has particular application in the field of detecting and signaling as by lights the precise acceptable, oversize or undersize zone in which a dimension indicating float lies along an internally tapered flow tube.

2. Description of the Prior Art

One related prior device is that disclosed in U.S. Pat. No. 2,503,091, directed to an electric motor control system shown as particularly applied to the control of rate of flow. Another related prior device is a flow meter having photo-diode registration of gas flow as disclosed in U.S. Pat. No. 3,193,816. One of the inherent disadvantages of these and other prior known similar devices is that a single photocell or sensing element is used to establish each limit defining the boundaries of zones within which zone defining signals are desired. By so employing a single photocell of sensing element to define a limit, the movable object, whether it be a float or other responsive indicator, can arrive at the limit and mask or trigger the sensor and then depart from that limit in either direction, that is, into either of the zones lying to each side of the limit, without the system having the inherent capability of signaling in which zone the object or indicator then lies. This and other basic problems with these prior devices have been overcome in the apparatus of the present invention which offers other advantages as will be apparent from the following disclosure.

SUMMARY OF THE INVENTION

In the apparatus of the present invention the combined advantage of limit detection along with positive detection from that limit of the zone to each side thereof wherein a movable object or float lies is accomplished by the pairing or sensing elements in sensing stations at each limit in conjunction with a unique circuit responsive both to direction and position.

The present invention also offers a circuit arrangement for inter-relating such sensing stations so that positions in a plurality of zones defined thereby can be precisely sensed and signaled.

DESCRIPTION OF THE DRAWINGS

An illustrative embodiment of the present invention is shown in the following drawings, in which.

DESCRIPTION OF THE PREFERRED EMBODIMENT

Figure 1:
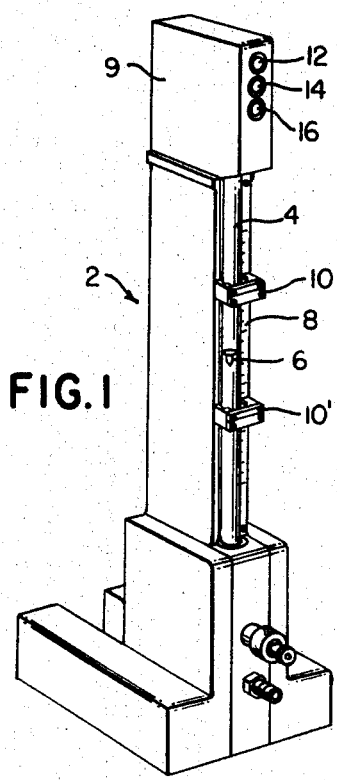
FIG. 1 is a perspective view of a preferred embodiment of the invention showing the sensing apparatus mounted for use on a pneumatic gaging instrument.

In an exemplary embodiment of the invention, there is shown in FIG. 1 a pneumatic gaging apparatus, shown generally as 2, of the type disclosed in Byrkett et al. U.S. Pat. No. 3,289,464. The gaging apparatus includes a vertical air flow indicating tube 4 having a body such as a float 6 contained therein. The float is positioned along the tube by air flow therethrough in response to the product characteristic or dimension being measured when the gage is connected in a known manner to a regulated source of air and the required tooling. The position of the float may be referenced to an associated scale 8 adjacent tube 4. The float position sensing apparatus of the present invention are shown generally as sensing stations 10 and 10' and are adapted for mounting on tube 4 in any conventional method such as by the use of a spring clip. It can be seen that stations 10 and 10' establish two reference limits upon the tube thereby dividing the tube into three zones. While depending upon the application, in one illustrative known use of apparatus of this type, the zone between the limits indicate an acceptable part, the zone above the upper limit indicates an undersize part and the zone below the lower limit indicates an oversize part. Signal means such as lights 12, 14 and 16 are connected through electronic signal circuits to stations 10 and 10' in a manner to be described below and represent the above mentioned three zones of the gaging instrument. In the position of the float shown, light 14, would be on and representing the zone between the two sensing stations. Lights 12 and 16 would respectively indicate the upper and lower zones of the tube. The only change required to enable use of the present invention with the gaging instrument of Byrkett et al. U.S. Pat. No. 3,289,464 is to replace the tube cap shown in Byrkett et al. with a tube cap as shown at 9 containing the limit lights 12, 14 and 16. The electronic circuitry may be mounted out of sight in the rear of the column or may be mounted in a tube cap such as 9.

Figure 2:
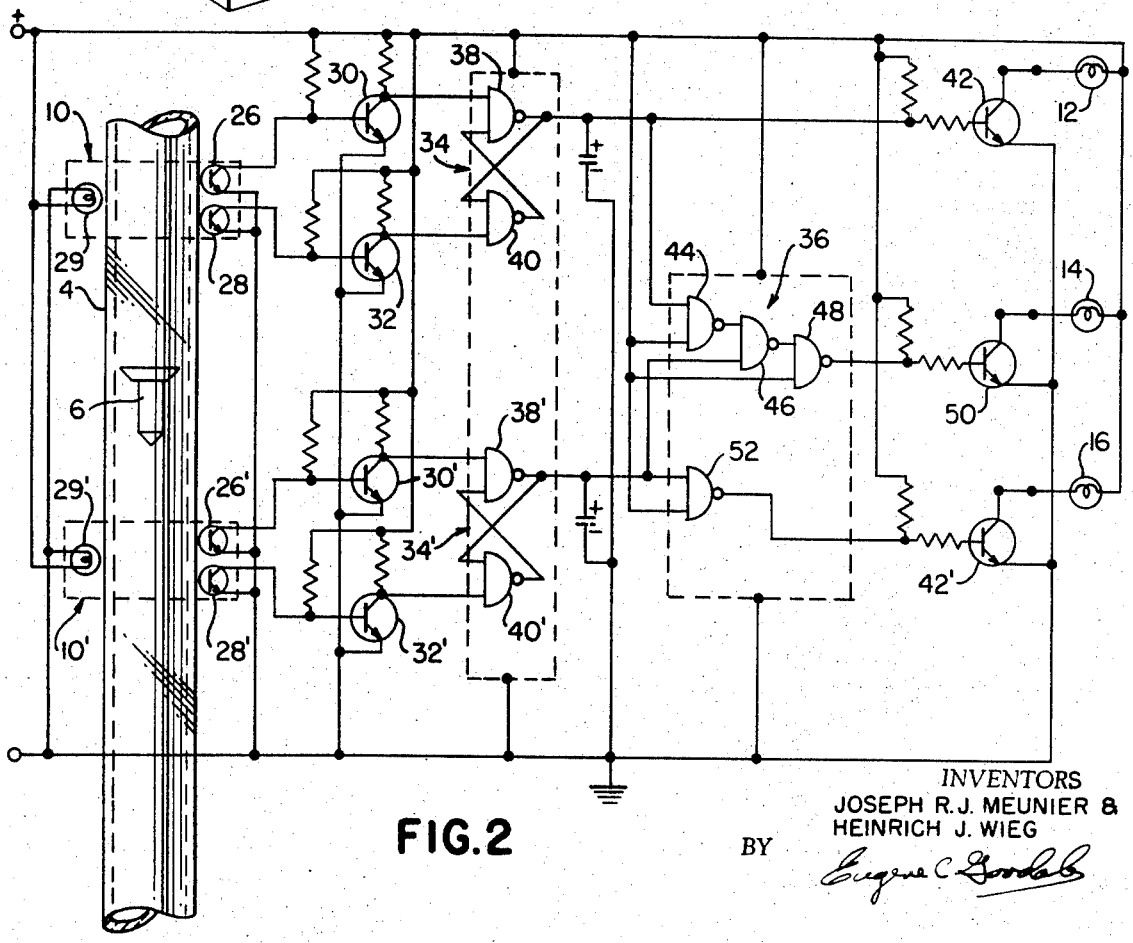
FIG. 2 is a diagrammatic view of the invention.

As seen in FIG. 2, sensing station 10 comprises two sensing elements 26 and 28. Although numerous types of sensing elements may by used, it has been found advantageous in the present embodiment to utilize photoelectric detectors of the type commonly called phototransistors which are responsive to a light source 29. The two sensing elements 26 and 28 plus the light source 29 form a single sensing station along the flow tube 4. It should be noted that components associated with sensing station 10' which are identical with similar components associated with station 10 are numbered the same with the addition of prime marks. Each sensing element provides separate sensing and non-sensing output condition signals independent of the other relative to the position of the float in relation to each of the individual sensing elements. In the float position shown the light from the light source 29 is not intercepted and both sensing elements will be turned on permitting current flow through each element to ground. Each element thus provides a low output condition signal to transistors 30 and 32 respectively. If the float 6 moves up to intercept the light impinging on sensing element 28, element 28 will be turned off which will in effect provide a high output condition signal to transistor 32. It can be seen that the linear spacing between the sensing elements is less than the columnar height of the float. Thus, each element may be eclipsed or shaded by the float and at one point the float will totally shade both sensing elements. Thus, when a sensing element is turned off, that element is in effect sensing the presence of the float position relative to the sensing station. Thus, the region opposite each sensor which the float 6 must occupy to shade sufficiently to produce the high output signal defines a reference location with respect to each sensor, and the presence of the float 6 at this reference location produces a high output signal while its absence therefrom produces a low output signal.

The signal lights 12, 14 and 16 are operatively connected and responsive to the sensing stations 10 and 10' through identical signal circuits which includes a logic decoding circuit. Each signal circuit provides a first or second output signal state which represent corresponding positions of float 6 relative to the sensing elements of a sensing station. Each signal circuit includes a unique set, reset flip-flop shown generally as 34 which will change the circuit output signal from one state to the other in response to changes in the sensing element output condition signals. Flip-flop 34 also performs a "memory" function in the circuit to keep track of the float movement within the tube in a manner to be described herebelow. A logic decoding circuit, shown generally as 36, is operatively connected to each sensing station signal circuit and provides means to enable and disable the respective signal lights indicating the position of the float 6 within the tube 4 as determined by the output condition signals of the sensing elements of each sensing station.

The signal circuit associated with sensing station 10 will now be described in detail. It should be noted that corresponding elements in the signal circuit associated with sensing station 10' are indicated with the prime mark and are identical in use in function as the corresponding elements in the station 10 signal circuit.

The output condition signal form each sensing element 26 and 28 is used to drive an inverter switch or transistor 30 and 32 respectively. Transistors 30 and 32 invert the respective output condition signals. Thus, for example, a high output condition signal from sensing element 26 will be inverted to a low condition signal by transistor 30. Transistors 30 and 32 are operatively connected to flip-flop 34 whereby the inverted signals form the inputs to said flip-flop.

Cross coupled NAND gates 38 and 40 comprise the set, reset, flip-flop associated with the signal circuit of sensing station 10. One input of NAND gate 38 is operatively connected to transistor 30 and one input of NAND gate 40 is operatively connected to transistor 32. The output of each NAND gate is connected to and forms the second input for the other NAND gate. It can be seen that the state of the cross coupled gates is determined by the sensing element output condition signals which are inverted by transistors 30 and 32. The NAND gates used in the cross coupled gates and those later described are of the type using positive logic such that a low output signal is provided only in the unique case where there are two high inputs to the NAND gate. Thus, where "H" and "L" indicate high and low states respectively, the truth table for the NAND gate (where 1 and 2 are inputs and 3 is output) is as follows:

| 1 | 2 | 3 |
|---|---|---|
| H | H | L |
| L | H | H |
| H | L | H |
| L | L | H |

The output from NAND gate 38 also determines the state of the signal circuit output signals. If the state of cross coupled gates 34 is such that the output signal state from gate 38 is high, base current will be supplied to transistor 42 turning it on to complete the circuit through light 12 which will cause light 12 to be turned on.

Light 16 is controlled by the output signal state of NAND gate 38' which provides one input to an inverted NAND gate 52. The positive power supply provides a continuous high state to the second input to NAND gate 52. It is seen that with a constant positive power source as one input, the NAND gate may be treated functionally as a single input inverter. The output from NAND gate 52 is connected to transistor 42' which operatively controls light 16. Thus, whenever the output from NAND gate 38' is in a low state, NAND gate 52 provides a high signal state to transistor 42' which will be turned on causing light 16 to be energized.

Light 14 is controlled through a logic decoding circuit 36 comprising a plurality of interconnected NAND gates 44, 46 and 48 and will only be energized when the float is between the upper and lower reference limits of the sensing stations. In order to energize light 14, indicating the float is between the two limits, the logic circuit must detect the unique case when the signal circuit state controlled by NAND gate 38 is low and the signal circuit state controlled by NAND gate 38' is high. It is seen that the positive power source is used to provide a continuous high state as one input to NAND gates 44 and 48. The second input to NAND gate 44 is connected to the output signal state controlled by NAND gate 38. The output from NAND gate 44 forms one input for NAND gate 46 with the second input being operatively connected to the signal circuit state controlled by NAND gate 38'. The output from NAND gate 46 forms the second input for NAND gate 48 and the output from NAND gate 48 is operatively connected to transistor 50 which controls signal light 14. Thus, when the signal circuit state controlled by NAND gate 38 is low and the signal circuit state controlled NAND gate 38' is high, the output from NAND gate 48 will be high supplying base current to transistor 50 which will be turned on completing the circuit through light 14 and energizing light 14.

In operation, the sensing stations are attached to the flow tube 4 to establish the reference limits of the gaging apparatus. When the electrical circuitry is turned on, the sensing elements and signal circuits have no way of knowing whether the float 6 is above, between or below the reference limits; therefore it is necessary to move the float past each sensing element at least once. In so doing, the cross coupled NAND gates will assume a condition state determined by the float passing each station and will so remain until the proper changes occur from the sensing element output condition signals as will be explained below. Thus, when the float is in a position below sensing element 28', the output condition signal of each sensing element will be low and will not turn on transistors 30, 32, 30' and 32'. Inasmuch as these transistors are not turned on, the circuit state between each transistor and the respective cross coupled NAND gate will be high. The cross coupled NAND gates will thus be in a state in which the output from gates 38 and 38' is low. Since the inputs to NAND gate 52 are now a low and positive respectively, NAND gate 52 provides an output having a high state which turns on transistor 42' causing light 16 to be energized. Light 12 is not energized with the float in the aforementioned position because the signal state from NAND gate 38 is low which does not turn on transistor 42. Also it is seen that the final output from NAND gate 48 is in a low state which does not turn on transistor 50.

As the float moves up to shade sensing element 28', the output condition signal will be high and will turn on transistor 32' allowing current flow therethrough to ground. Thus the input to NAND gate 40' will be a low state. However, there is no change in state of the cross coupled NAND gate 34' and the output signal state from 38' will continue to be low causing the energization of light 16 as above described. It can be seen that if the float now uncovers sensing element 28' in a downward motion, there will be no change in the signal lights. In fact, the float may repeatedly cover and uncover sensing element 28' as before described and there will be no change in the signal light indications. However, should the float continue to rise in the tube so as to shade both sensing elements 26' and 28', light 16 will be turned off and light 14 will be energized. Thus, with both signal elements shaded the respective output condition signals therefrom will be high turning on transistors 30' and 32' respectively so that the inputs to NAND gates 38' and 40' will both be in the low state. In this condition, cross coupled NAND gates 34' assumes the state in which the output from NAND gate 38' is high. With two high inputs to NAND gate 52, the output therefrom will be low which fails to turn on transistor 42', thus disabling light 16. The output signal state from the cross coupled NAND gate 34 is still in the low state causing the output from NAND gate 44 to be high. Thus, the two inputs to NAND gate 46 are both high resulting in a low output from gate 46 to NAND gate 48 which now has one high and one low input. In this condition, NAND gate 48 provides an output in the high state which will turn on transistor 50 and energize light 14.

If the float drops down to uncover sensing element 26', the conditions exits as before mentioned and light 14 will be disabled while light 16 becomes energized. It can be seen that if the float continues to rise in the tube so as to first uncover sensing element 28', uncover sensing element 26', and then shade sensing element 28, there is no change in state of both cross coupled NAND gates 34 and 34'. The final signal state determined by cross coupled NAND gates 34' remains in the high state while the signal state determined by cross coupled NAND gates 34 remains in the low state. Thus, signal light 14 is energized whenever float 6 is in a position from shading only sensing element 28 down to and including shading both sensing elements 26' and 28'.

When float 6 rises and shades both sensing elements 26 and 28, the output state from cross coupled NAND gate 34 changes from a low state to a high state which will turn on transistor 42 and energize light 12. Hence, with the respective state from each cross coupled NAND gate 34 and 34' being high, it is seen that the outputs from NAND gates 48 and 52 will both be low resulting in both lights 14 and 16 being disabled.

Light 12 will continue to be energized so long as the signal state provided by cross coupled NAND gate 34 remains in a high state which will occur in any position of the float from shading both sensing elements 26 and 28 to uncovering both sensing elements in the upward direction and in the downward direction to just shading both sensing elements. However, should the float descend so as to uncover sensing element 26 while still shading sensing element 28, the previously described conditions will exist in which the circuit state controlled by cross coupled NAND gates 34 changes from high to low causing the disabling of light 12 while energizing light 14.

Figure 3:
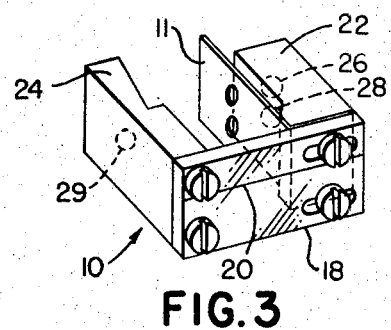
FIG. 3 is a perspective view of a sensing station.

FIG. 3 shows a perspective view of sensing station 10 having a spring element 11 for clip mounting the station along tube 4. The spring element has two apertures therein for passage of light therethrough to each sensing element. side portions 22 and 24, which house the light source and sensing elements, are held by a transparent plate 18 which may be secured thereto by any suitable means such as screws or the like. A line 20 may be scribed on the transparent plate 18 at the location of the station reference limit.

It is seen that the present invention provides a multiple limit device free of ambiguity due to direction of float travel and has limits sharply defined. The unique electronic circuitry herein also performs a "memory" function in that the circuit is sensitive to the direction of float movement into and out of each sensing station. In other words, before the signal lights are switched from one to the other, the lower sensing element must first be shaded and then the state of the upper sensing element must change while the lower sensing element remains shaded. Stated another way, switching occurs with the transition from light to dark or dark to light of the upper sensing element when, and only when, the lower sensing element is shaded. Thus, whenever the last sensing element of the pair is uncovered, the cross coupled NAND gates associated with that sensing station will retain the state occurring when the last of the pair of elements was covered. The cross coupled NAND gates thus performed a memory function and will retain the signal state determined when the last sensing element was shaded. This state will be retained until the conditions arise for causing the switching as before mentioned.

The upper sensing element of each sensing station thus forms the reference limit for switching from one light signal to another. Inasmuch as spacing of the two sensing elements is less than the columnar height of the float, the hysteresis of each reference limit is reduced to a dependency on the window dimension and the light-dark proportion within the window necessary for switching the state either way of a single sensing element. Although the present circuit has been described in which the upper sensing element is used to establish the reference limit, it is apparent that the circuit would work equally well with the reference limit being established as the lower sensing element of each sensing station. It is also apparent that devices other than signal lights might be used either in conjunction with signal lights or in lieu thereof. For instance, the light energizing signals can be used for relay energization and actuation of segregating gates so that the parts being measured can be segregated according to size.

The present invention may be modified so as to provide a single limit device in which only two signal lights would be utilized to indicate the position of the float either above or below the reference limit. In this modification, a single sensing station 10 would be used together with the associated circuitry including transistors 30 and 32, a pair of cross coupled NAND gates 34, transistor 42 and signal 12, NAND gate 44, transistor 50 and signal light 14. Thus the output from NAND gate 44 would be used to directly control transistor 50 and light 14. If the state of the cross coupled NAND gate 34, depending upon the position of float 6 relative to sensing station 10, provided a high signal state; then transistor 42 would be turned on energizing light 12. In this state, NAND gate 44 would provide a low output state which would not turn on transistor 50. When the state of cross coupled NAND gates 34 switches from the high state to a low state, 42 would be turned off disabling light 12 and the output of NAND gate 44 would be in the high state which would turn on transistor 50 and energize light 14.

While the present invention has been described showing single and two limit embodiments, it is apparent that one skilled in the art may use the teaching herein described and extend the invention to include any number of limits desired.

It is thus seen that the present invention provides an apparatus for precisely detecting the location of a movable object along a predetermined path relative to a pre-established limit and will signal precisely the location of the object in the zones lying to each side of that limit.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. Apparatus for sensing the position of a movable object along a predetermined path relative to pre-established limits comprising:

first and second sensing stations establishing corresponding limits along the path of a movable object, said stations cooperatively establishing three zones along said path including a zone between said stations and zones beyond each of said stations;

each said sensing station including first and second independent sensing elements cooperatively establishing a reference limit, each sensing element providing separate sensing and non-sensing output condition signals in response to the position of said movable object relative thereto, the spacing between said sensing elements being less than the dimension of said movable object, whereby said sensing elements may independently sense said object and at one position said sensing elements will simultaneously sense the presence of said object;

a separate signal circuit operatively connected for response to each sensing station and providing first and second output signal states representing positions of said movable object relative to the respective reference limit;

each said signal circuit including means for changing the respective circuit output from one state to the other in response to changes in said station element output condition signals and providing a unique relationship of said circuit output signal states in response to the positioning of said movable object in each of said zones;

first, second and third signal means respectively representing each of said zones operatively connected to said signal circuits and responsive to said output signal states;

enabling means operatively connected to said signal circuits and to said signal means for enabling the representative zone of said signal means while simultaneously disabling the remaining signal means in response to the relationship between the outputs of said signal circuits and the zone in which said object lies.

2. Apparatus set forth in claim 1 in which each said means for changing said output signal states further comprises:

inverting means respectively connected to each of said first and second sensing elements and responsive thereto providing inverted output condition signals relative to the signal of the respective element;

cross coupled NAND gates operatively connected to said inverting means and providing said output signal states from one of said gates, each of said gates having two inputs and a single output and providing a gate output signal determined by said inputs, one input of each gate being operatively connected to one of said inverting means for response to inverted output condition signals therefrom, each of said gate output signals being connected to and providing the second input to the other said gate whereby said signal circuit output signal state is determined by state of said cross coupled gates; and said enabling means including a logic circuit providing a logic signal enabling said second signal means only when said first cross coupled gate provides a first circuit output having a first signal state and said second cross coupled gate provides a second circuit output having a second signal state.

3. Apparatus as set forth in claim 2 in which said logic circuit comprises:

a first NAND gate providing a first input connected to a positive power source and a second input connected to a first cross coupled NAND gate output signal, said NAND gate providing output signal states to enable and disable said third signal means in response to the state of said first cross coupled NAND gate;

a second NAND gate providing a first input connected to said positive power source and a second input connected to a second cross coupled NAND gate output signal;

a third NAND gate providing a first input connected to the output of said second NAND gate and a second input connected to said first cross coupled NAND gate output signal; and a fourth NAND gate providing a first input connected to the output of said third NAND gate and a second input connected to said power source, said fourth NAND gate providing a signal enabling said signal means.

4. Apparatus for sensing and indicating, relative to pre-established limits, the location of an object positionable along a flow path in response to the characteristic of a body being measured, said measuring means comprising:
   a transparent flow tube vertically connected between said air supply and said outlet;
   a float in said tube positioned therealong in accordance with the flow upward through said tube;
   first and second sensing stations along said tube establishing corresponding limits on said tube and along the path of said float, said stations cooperatively establishing a first zone above said first station, a second zone between said stations, and a third zone below said second station, each said station comprising
      a light source providing a beam of light across said tube; first and second photodetectors spaced apart along said tube less than the dimension of said float and cooperatively establishing a reference limit, each photodetector being operatively responsive to said beam and providing separate sensing and non-sensing output condition signals in response to the position of said float relative thereto, whereby said photodetectors may independently sense said float and at one position said photodetectors will simultaneously sense the presence of said float;
   a separate signal circuit operatively connected for response to each sensing station and providing first and second output signal states representing positions of said float relative to the respective reference limit;
   each said signal circuit including means for changing the respective circuit output form one state to the other in response to changes in said station photodetector output condition signals and providing a unique relationship of said circuit output signal states in response to the positioning of said movable object in each of said zones;
   first, second and third indicator means respectively representing each of said zones operatively connected to said signal circuits and responsive to said output signal states;
   enabling means operatively connected to said signal circuits and to said indicator means for enabling the representative zone of said indicator means while simultaneously disabling the remaining indicator means in response to the relationship between the outputs of said signal circuits and the zone in which said object lies.

5. A position indicator for indicating the position of a body relative to a reference location comprising:
   first detector means operative to produce a first signal in response to the presence of said body at said reference location and operative to produce a second signal in response to the absence of said body from said reference location;
   means producing a first indicator signal in response to said detector means second signal whenever said body is positioned away from said reference location in one direction and producing a second indicator signal in response to said detector means second signal whenever said body is positioned away from said reference location in another direction, and further including means producing one of said indicator signals in response to said first signal;
   said means producing said first and second indicator signals including a second detector means producing a third signal in response to the approach of said body towards said reference location in one of said directions and further includes means controlling the response of said means producing said first and second indicator signals to said first signal in response to said third signal, whereby indications of the positions of said body along said directions relative said reference location are provided.

6. The indicator of claim 5, wherein said first detector means includes a detector positioned so as to produce said first and second signals in the presence and absence of said body from said reference location, respectively, and wherein said second detector means includes a second detector positioned spaced from said first detector along the path of one said directions a distance less than a dimension of said body and producing said third signal when said body passes said second detector.

7. The indicator of claim 6 wherein said detectors are photoelectric detectors and said first and second detector means includes a light source positioned so that said body intercepts a portion of the light which normally impinges a said photoelectric detector in passing said detectors.

8. The indicator of claim 6 wherein said second detector also produces a fourth signal when said body is not positioned by said second detector and wherein said first, second, third, and fourth signals are high-low logic signals, and wherein both said means producing indicator signals includes cross-coupled NAND gates, with the output of said first detector being one input to one of said NAND gates, and the outputs of the second detector being one input to the other of said NAND gates, and the outputs of said NAND gates being cross-coupled to the other inputs of said NAND gates, and wherein said means producing said indicator signals includes means responding to the output of said one NAND gate to produce said indicator signals.

* * * * *